United States Patent

[11] 3,572,479

[72] Inventor Oliver K. Kelley
    Bloomfield Hills, Mich.
[21] Appl. No. 844,324
[22] Filed July 24, 1969
[45] Patented Mar. 30, 1971
[73] Assignee General Motors Corporation
    Detroit, Mich.

[54] STEP-RATIO TRANSMISSIONS WITH FLUID OPERATED SYNCHRONIZING BRAKE
    9 Claims, 9 Drawing Figs.
[52] U.S. Cl. .................................................. 192/4,
    74/339, 188/264, 137/51, 303/13, 74/869, 73/523,
    192/109
[51] Int. Cl. ..................................................... F16h 57/10
[50] Field of Search ................................. 192/4 (A);
    74/339

[56] References Cited
    UNITED STATES PATENTS
    2,469,743  5/1949  Newton .......................... 192/4R
    2,745,526  5/1956  Saives ............................ 192/4A
    2,908,365  10/1959  Zens et al. ..................... 192/4A
    3,476,225  11/1969  Hass et al. ..................... 192/4A Primary Examiner—Benjamin W. Wyche
Attorneys—W. E. Finken, A. M. Heiter and D. F. Scherer ABSTRACT: A control system for an even step-ratio power transmission driven by a gas turbine power source. A synchronizing brake is adapted to decrease the speed of the turbine shaft and transmission input shaft to establish a predetermined speed ratio between the input and output shafts of the transmission during upshifting of the transmission and to permit the turbine shaft speed to increase to establish a predetermined speed ratio between the input and output shafts during downshifting of the transmission. The synchronizing brake is controlled by a synchronizing valve which is controlled by an accumulator governor pressure and by an input governor pressure. Fluid pressure from the governor and the accumulator to the synchronizing valve is controlled by a governor control valve that is movable to an upshift position to direct governor pressure to one side of the synchronizing valve and accumulator pressure to the other side and to a downshift position to reverse the governor and accumulator pressure connections on the synchronizing valve.

Patented March 30, 1971

INVENTOR.
Oliver K. Kelley
BY
Donald F. Scherer
ATTORNEY

Patented March 30, 1971

INVENTOR.
Oliver K. Kelley
BY
Donald F. Scherer
ATTORNEY

INVENTOR.
Oliver K. Kelley
BY
Donald F. Scherer
ATTORNEY

STEP-RATIO TRANSMISSIONS WITH FLUID OPERATED SYNCHRONIZING BRAKE

This invention relates to hydraulic controls and more particularly to hydraulic controls for controlling shifting in a step-ratio power transmission driven by a gas turbine engine.

In most heavy-duty vehicles, such as trucks, a torque converter, driven by an internal combustion engine, is coupled with a close-ratio planetary gear transmission. The torque converter usually has a low torque multiplication ratio to permit rapid coupling for increased efficiency. Therefore, to reduce the shift shock during a ratio change, a close-ratio planetary transmission, having a step ratio on the order of 1.1 to 1.3, is used to accommodate the relatively short torque multiplication range of the torque converter. Also, in torque converter planetary transmission, the drive train must absorb the energy accompanying the ratio change. The close-ratio transmission is useful in decreasing the energy absorption requirement. However, a large number of ratios is required to provide a satisfactory overall operating range. The present invention, eliminates the need for a torque converter while permitting the use of a larger step ratio, for example 1.7, in the planetary transmission. The present invention uses a synchronizing brake to control the transmission input speed during shifting. This synchronizing brake is grounded to the engine case so that no drive line reaction occurs during a shift. Thus on an upshift under power, the shift energy is absorbed by the engine case and no drive line shift shock is present.

A synchronizing brake, reacting full braking torque directly to ground, is operatively connected with the gas turbine output shaft and is controlled by the hydraulic control valving of the transmission. During an upshift in the transmission, the drive is first disconnected in the gearing and the synchronizer brake is applied to reduce the output speed of the engine, so that before the shift into new gear ratio is completed, the input shaft of the transmission and the output shaft of the transmission are substantially in the same proportion as the oncoming gearing ratio of the transmission. During a downshift, the transmission input shaft is permitted to accelerate before the synchronizer brake is applied to hold it so that the speed ratio between the output shafts will be the same as the oncoming gearing ratio.

Engagement of the synchronizing brake is controlled by a differential area synchronizing valve which is responsive to a governor accumulator pressure and an input governor pressure. The governor accumulator pressure is constant relative to governor pressure during shifting and is proportional to the speed of the engine output shaft before the shift. The governor pressure varies with the speed of the engine output shaft during the shift. A governor control valve, responsive to a shift synchronizer control valve in the transmission control, directs the governor pressure and governor accumulator pressure to opposite ends of the synchronizing valve depending on whether an upshift or downshift is occuring. During an upshift, governor pressure, acting on the large area of the synchronizing valve, holds the valve open and the synchronizer brake engaged until the speed of the engine output shaft is reduced. During a downshift, governor accumulator pressure, acting on the large area, holds the valve closed and the synchronizer brake disengaged until the engine output shaft has accelerated to a speed such that governor pressure acting on the small land will open the valve to engage the brake. The diameters of the differential areas have the same proportion as the step ratio between the gear ratios. Therefore, the speed ratio of the input and output shafts of the transmission is equal to the step ratio.

The synchronizer brake must receive sufficient amount of cooling fluid to prevent overheating during the synchronizing operation. The brake is a multiple disc-type brake having brake plates secured to the engine housing and alternately spaced brake plates drivingly connected to the engine output shaft. The brake plates have openings through friction surfaces to permit the flow of cooling fluid through the center of the engaging surfaces. The brake plates on the housing have radial slots to direct cooling fluid inwardly and outwardly from the center of the engaging surfaces. A single-stroke rotary pump, actuated by a vane responsive to the transmission control, supplies cooling fluid to the brake during the engagement thereof.

An object of this invention is to provide in an improved transmission control a synchronizer brake responsive to a synchronizing valve which is opened by governor pressure during an upshift and closed by relatively constant pressure and vice versa during a downshift.

Another object of this invention is to provide in a step-ratio transmission control a synchronizer relay valve controlled by a step-ratio shift valve and controlling a synchronizer control valve which directs pressure fluid to a synchronizing valve to control the input speed to the transmission during an upshift or a downshift.

Another object of this invention is to provide in a step-ratio transmission, a liquid-cooled synchronizer brake for an engine output shaft controlled by a synchronizing valve adapted to be responsive to input governor speed and controlled by the shift valving of the step-ratio transmission.

These and other objects and advantages of the invention will be more apparent from the following description and drawings in which.

Figure 1:
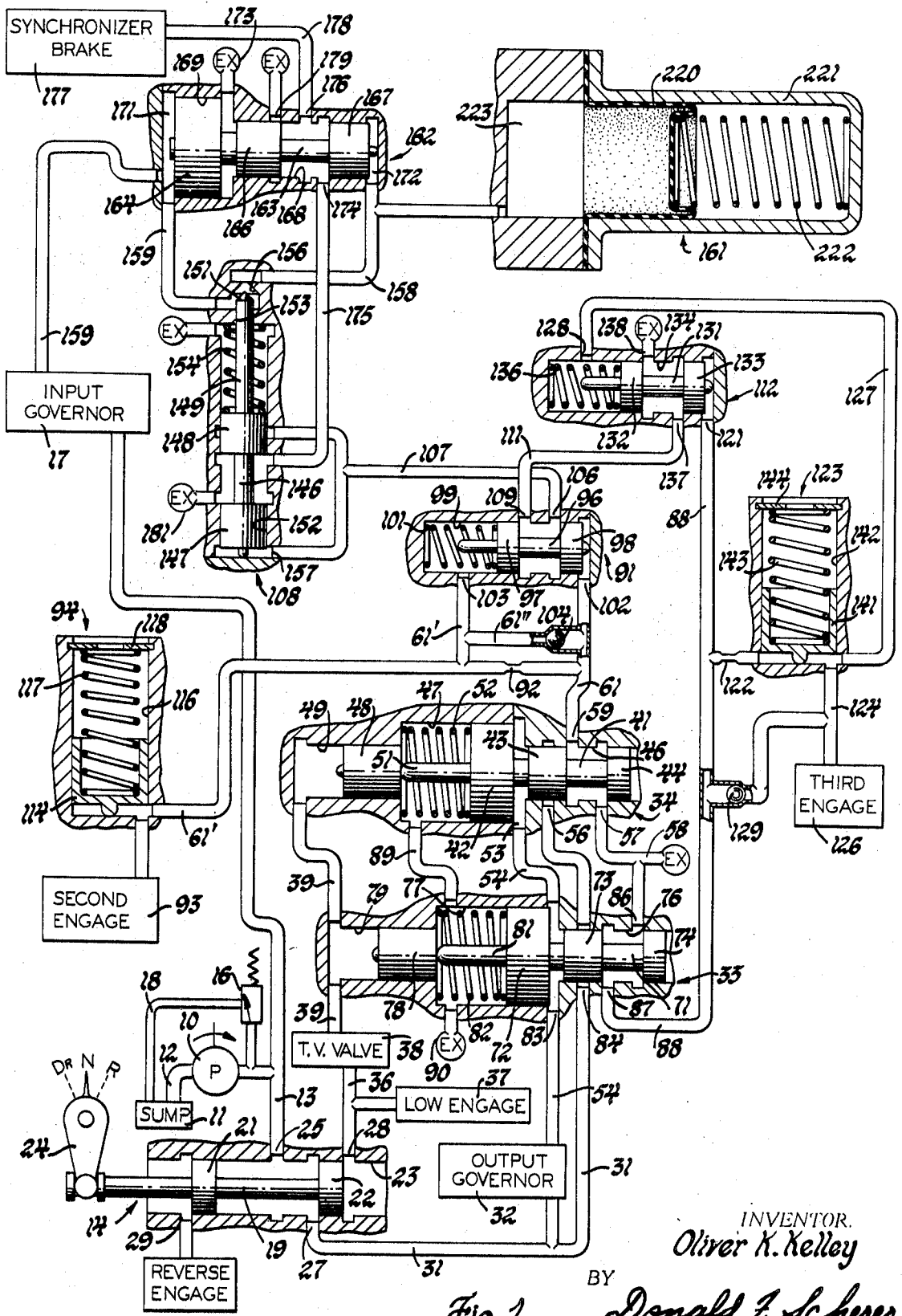
FIG. 1 is a diagrammatic representation of one embodiment of the invention having upshift synchronizing only.

Referring to the drawing, there is shown in FIG. 1 a hydraulic control system including an engine-driven pump 10 which draws fluid from a sump 11 through an inlet passage 12 and delivers fluid via outlet passage 13 to a manual control valve 14, a pressure regulator valve 16 and an input governor 17. The pump 10 is of conventional design as is the regulator valve 16. The regulator valve 16 limits the discharge pressure of the pump to a fixed value and delivers any overage via passage 18 back to the sump 11. The manual control valve 14 includes a valve spool 19 having a pair of spaced lands 21 and 22 slidably disposed in a bore 23 and operatively connected to a control link 24 which is movable to drive, neutral, and reverse positions by the operator. The valve bore 23 has an inlet port 25 connected to discharge pressure passage 13, an outlet port 27, a forward port 28, and a reverse port 29. The outlet port 27 is open between lands 21 and 22 in both the neutral and drive position to port 25 and thus in these two positions, delivers pressure via passage 31 to an output-driven governor 32, a 2—3 shift valve 33, and a 1—2 shift valve 34. The port 28 is connected to port 25 between lands 21 and 22 whenever the valve spool 19 is in the drive position to deliver pressure fluid via passage 36 to a low-ratio engaging device 37 and a TV valve 38. The TV valve 38 is a conventional manually operated, pressure reducing valve which produces a reduced pressure in a passage 39 that is proportional to the operation accelerator control setting. The low-ratio engaging device 37 is a conventional one-way brake adaptive to be connected to the transmission housing via a friction brake so as to establish a reaction member in the planetary gearing.

The 1—2 shift valve 34 includes a valve spool 41 having a large diameter land 42 and two spaced equal, but smaller, diameter lands 43 and 44. The small diameter lands 43 and 44 are slidably disposed in a bore 46. The large diameter land 42 is slidably disposed in a bore 47 to which is connected to a governor port 53 which is connected to a governor passage 54. The governor passage 54 is connected to the output-driven governor 32 and supplies a pressure proportional to the transmission output speed. Passage 39 provides a TV bias to a bore 49 in which is slidably disposed a plug 48 which engages a stem 51 which is a reduced diameter extension of land 42. A return spring 52 is disposed between the end of bore 47 and the valve land 42 to urge the 1—2 shift valve to the downshifted position shown. The bore 46 has an inlet port 56 connected to pressure passage 31, an exhaust port 57 connected to an exhaust passage 58 and a second ratio control port 59 connected to a second ratio passage 61. In the position shown, the passage 31 is closed to the second ratio passage 61 by valve land 43 while the passage 61 is open between lands 43 and 44 to the exhaust passage 58. However, when the governor pressure in passage 54, acting on the right side of land 42, becomes sufficient to overcome return spring 52 and the TV bias on plug 48, the valve spool 41 will upshift thereby disconnecting passage 61 from exhaust 58 while connecting it between lands 43 and 44 to passage 31 thus directing pump pressure through the second ratio passage 61.

The 2—3 shift valve 33 is similar in construction to the 1—2 shift valve 34 and has valve spool 71 with a large diameter land 72, a pair of small diameter lands 73 and 74. The small diameter lands are slidably mounted in a bore 76. A TV plug 78 is slidably mounted in a bore 79 which is in fluid communication with TV passage 39 to supply a TV downshift bias to the shift valve 33. The valve land 72, slidable in bore 77, has a small diameter extension 81 which engages the TV plug 78. The bore 77 also houses the return spring 82 which is held in compression between the bottom of bore 77 and valve land 72. The bore 77 has a governor port 83 which is connected to governor passage 54 to produce an upshift signal to the shift valve 33. The bore 76 has an inlet port 84 connected to passage 31, an exhaust port 86 connected to exhaust passage 58 and a third ratio port 87 connected to a third ratio passage 88. An exhaust passage 89 interconnects valve bores 47 and 77 and connects them to an exhaust port 90 which prevents pressure buildup in the shift valve spring chambers due to leakage of fluid past the valve lands 72 or 42 or the plug valves 78 or 48. In the downshifted or second gear position as shown, the passage 31 is closed to the third ratio passage 88 by valve land 73 while the third ratio passage 88 is open between lands 73 and 74 through exhaust passage 58. However, when governor pressure in passage 54 becomes sufficient to overcome the force of return spring 82 and the TV bias acting on plug 78, the valve spool will upshift to the third speed position. In the upshifted position, the line passage 31 is connected between lands 73 and 74 to the third ratio passage 88 while the exhaust passage 58 is closed by the land 74.

The second ratio passage 61 is connected to a synchronizer relay valve 91 and through a restriction 92 to a second ratio engaging device 93 and a second ratio accumulator 94. The synchronizer relay valve 91 includes a valve spool 96 having equal diameter lands 97 and 98 slidably disposed in a valve bore 99 and biased to the position shown by a spring 101. The valve bore 99 is connected at its right end through port 102 to the second ratio passage 61 and at its left end to a port 103 to the second ratio passage 61' downstream of the restriction 92. The passage 61' is connected to the passage 61 through a passage 61'' and a ball check valve 104 which permits free flow from passage 61' to passage 61 and blocks reverse flow. As will be explained later, this provides rapid disengagement of the second ratio engaging device 93. The valve bore 99 also has a synchronizer control port 106 which is connected via passage 107 to a synchronizer control valve 108 and a synchronizer relay port 109 which is connected via passage 111 to a synchronizer relay valve 112.

The second accumulator 94 includes the piston 114 slidably disposed in a bore 116 and urged to one position therein by a spring 117 compressed between the piston 114 and a retaining ring 118. The lower side of the piston 114 is in communication with the second ratio passage 61' such that when the passage 61' is pressurized, the piston 114 moves upward in the bore 116 to control the pressure rise in the second ratio engaging device 93. The second ratio engaging device 93 may be similar in construction to that described above for the low-ratio engaging device, that is, it will include the one-way device operatively connected to a member of the planetary gearing and the friction engaging device operatively connected between the one-way device and a stationary member of the transmission.

The third ratio engage passage 88 is connected to the synchronizer relay valve 112 at a port 121 and through a restriction 122 to an accumulator 123 which is connected via passage 124 to a third ratio engaging device 126 and via passage 127 to a port 128 of the synchronizer relay valve 112. The third ratio engaging device 126 is also connected through a one-way check valve 129 to the third ratio engaged passage 88. This check valve 129 permits rapid exhaust of the third ratio engaging device 126 and the accumulator 123.

The synchronizer relay valve 112 is similar in construction to the synchronizer relay valve 91 and includes a valve spool 131 having equal diameter lands 132 and 133 slidably disposed in a valve bore 134. A bias spring 136 is located between the valve lands 132 and one end of bore 134 and urges the valve spool 131 to the position shown. The passage 127 is connected through port 128 to the bore 134 adjacent the spring 136 and the passage 88 is connected to port 121 at the end of the valve spool 131 opposite the spring chamber. A synchronizer relay control port 137 is connected to passage 111 which is connected to the synchronizer relay valve 91. The valve bore 134 also has an exhaust port 138 which is connected to the port 137 when the valve is in the position shown and is closed to port 137 by valve land 133 when the synchronizer relay valve is operated on by pressure in port 121.

The accumulator 123 is similar in construction to the accumulator 94 and includes a piston 141 slidably disposed in a bore 142 and a load spring 143 located between the piston and a snapring 144 in the bore 142. When pressure in third ratio passage 88 is present, the piston 141 will be moved upward to control the pressure rise in passage 124. The third ratio engaging device 126 is engaged by the pressure in passage 124 and thus the engagement rate is controlled by the accumulator 123 and the restriction 122. The third ratio engaging device 126 may be either a friction clutch or a friction brake depending upon the particular step-ratio transmission with which this control is used. It may differ from the second and low ratio engaging devices in that a one-way device between the friction member and the planetary gearing is not required.

The synchronizer control valve 108 includes a valve spool 146 having equal diameter spaced lands 147 and 148 and a stem member 149 having a conical end 151. The valve lands 148 and 149 are slidably disposed in a bore 152 and the stem 149 is slidably disposed in a bore 153. A spring 154 is located between land 48 and one end of bore 152. The tapered end 151 of the stem 149 is adapted to seat in a conical-shaped opening 156 whenever fluid pressure in passage 107 is admitted through a port 157 to the end of the valve land 147 thus urging the valve spool 146 against the spring 154. The conical opening 156 provides communication between an accumulator passage 158 and a governor passage 159. The governor passage 159 is supplied with fluid pressure from the input governor 17 that defines fluid pressure proportional to the engine output speed or transmission input speed which are the same. The passage 158 is connected to an accumulator 161. Both passages 159 and 158 are connected to a synchronizing valve 162.

The accumulator 161 includes a flexible diaphragm 220, a spring housing 221, and a spring 222 located between one side of the diaphragm and the end of the spring housing 221. The diaphragm separates the spring chamber from a pressure chamber 223 such that when input governor pressure in passage 159 passes through the synchronizer control valve 108 to the accumulator passage 158, the chamber 223 is pressurized. As the pressure increases in chamber 223, the diaphragm is moved to the right against the force of spring 222 and, therefore, fluid under pressure is stored into chamber 223. When the synchronizer control valve 108 is actuated by fluid pressure in passage 107, the passage 158 is closed by the end of valve spool 146 thereby entrapping the accumulator governor pressure in passage 158 to act on the end of land 167 of the synchronizing control valve 162. The accumulator 161 will maintain a relative constant pressure in passage 158 during the shifting of the transmission. Thus a constant reference source relative to the input governor pressure is maintained on the synchronizing valve 162 while the synchronizer brake is being regulated to maintain a desired output speed for the gas turbine engine prior to upshift completion.

The synchronizing valve 162 includes a valve spool 163 having a large diameter land 164 and two equal diameter spaced lands 166 and 167 which are slidably disposed in a valve bore 168. The large diameter land 164 is slidably disposed in chamber 169 and cooperates therewith to provide a governor pressure chamber 171. The valve land 167 cooperates with the bore 168 to provide a governor accumulator chamber 172 which is connected to the accumulator passage 158. An exhaust port 173 prevents pressure buildup on the one side of the valve land 164. The valve bore 168 has an inlet port 174 which is connected to the synchronizer control valve 108 through a passage 175, a brake apply port 176 which is connected to a synchronizer brake 177 by a brake apply passage 178 and an exhaust port 179. Whenever the synchronizer control valve 108 is in the position shown, the passages 158 and 159 are interconnected and the synchronizing valve will be in the position shown. That is, the passage 175 will be open between lands 166 and 167 to the brake apply passage 178. However, when the synchronizer control valve is in the position shown, the passage 175 is connected to exhaust port 181 and therefore the synchronizer brake is exhausted. However, when the passage 107 is pressurized, the valve spool 146 will be moved against the spring 154 thus admitting pressure in passage 107 to passage 175 through the synchronizing valve 162 to the brake apply passage 178 thereby applying synchronizer brake. Also, when the valve spool 146 is moved, the conical seat 151 will seat in the conical opening 156 thereby disconnecting the accumulator passage 158 and governor passage 159. With these two passage disconnected and the synchronizer brake applied, the turbine shaft and thus the input governor will decrease in speed so that the pressure in passage 159 will decrease. When the pressure in passage 159 is decreased such that the accumulator pressure in passage 158 times the area of land 167 begins to exceed the governor pressure in passage 159 times the area of land 164, the valve spool 163 will move to left and right to regulate the holding power of the synchronizing brake to hold turbine r.p.m. at balance. The pressure in the accumulator passage 158 is equal to the governor pressure prior to the shifting of valve spool 146; that is, the accumulator pressure is maintained at a constant which is proportional to the engine speed at the time the shift begins while the governor pressure rapidly decreases due to synchronizer brake engagement until the opposing forces on the spool 163 are equal. The synchronizing valve 162 and the synchronizer brake 177 regulate the turbine speed at this value until the shift is completed and relay valve 91 or 112 returns to exhaust.

Figure 5:
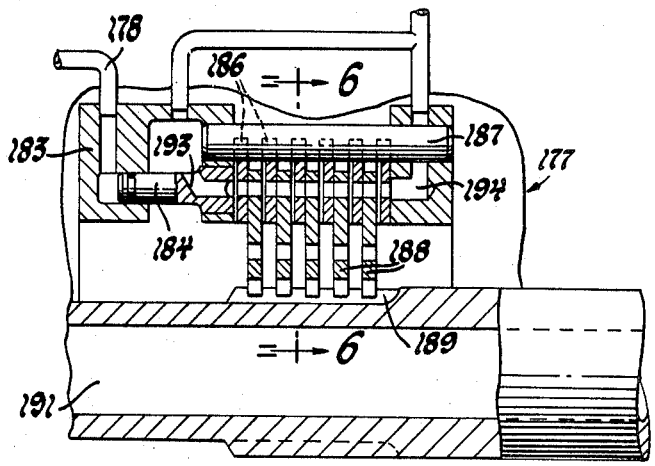
FIG. 5 is a partial elevational view in section of the synchronizer brake.
Figure 6:
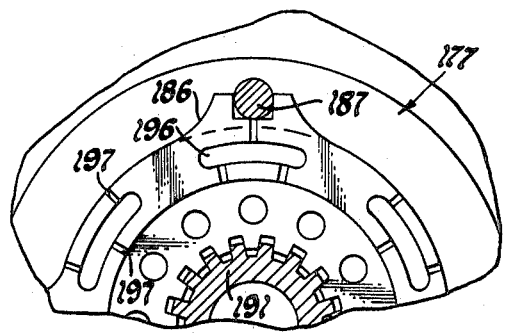
FIG. 6 is a view of a brake plate taken along line 6–6 in FIG. 5.

The synchronizer brake 177 is shown in FIG. 5 and includes a housing 183 which is a portion of a stationary part of the turbine engine, an annular piston 184 slidably mounted in the housing, a plurality of friction discs 186 slidably secured to the housing 183 through pins 187 and a plurality of friction discs 188 alternately spaced of the friction discs 186 and drivingly connected through a spline 189 to the turbine output shaft 191. The piston 184 has an opening 193 to permit coolant fluid to flow therethrough to the friction plates 186 and 188 and the housing 183 also has another opening 194 for the flow of incoming cooling fluid. The friction plates 186, as seen in FIG. 6, have a plurality of openings 196 in their friction faces which permits the flow of cooling fluid therethrough. The friction plates 188 have similar-type openings to permit the continuous flow of fluid through the brake pack. However, the number of openings in one of the plates 186 or 188 is even and the number of openings in the other plates is odd to insure continuous flow path through the plates while there is relative rotation between them. The friction faces of plate 186 also have a plurality of radial grooves 197 which permit the flow of cooling fluid to the inner and outer edges of the brake pack thus providing cooling for the entire plate surface. The width of the grooves 197 is controlled to insure proper cooling flow to the inner and outer edges.

Figure 7:
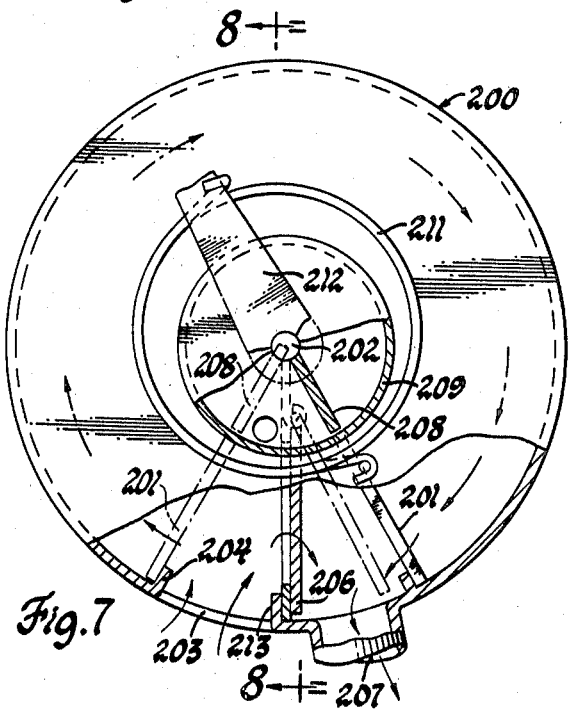
FIG. 7 is a plan view of the cooling pump used with the invention.
Figure 8:
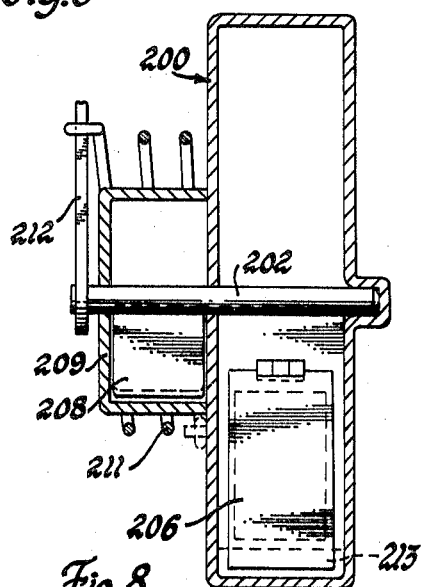
FIG. 8 is a cross-sectional view taken on line 8–8 in FIG. 7.

The cooling fluid for the synchronizer brake is provided by a single-stroke rotary pump such as that shown in FIG. 7 and FIG. 8. The pump includes a drumlike housing 200 which houses a single vane or paddle 201 that is mounted for rotation with a shaft 202. The vane 201 rotates in close sealing engagement with the outer diameter and sides of the drum 200. The drum 200 has an opening 203 which permits sump oil to enter the interior portion of the drum and a lip 204 which limits the counterclockwise rotation of the vane 201. A flapper valve 206 is located between the inlet opening 203 and a discharge port 207. Also connected to the shaft 202 is a drive vane 208 which is housed in a smaller drum 209. A torsional spring 211 is located around the outer periphery of the drum 209 and is connected through a lever 212 to the shaft 202. When pressure is admitted to brake apply passage 178, it is also admitted to one side of the driving vane 208 to cause the vane 201 to move from the dashed position in a clockwise manner to the position shown in solid lines. As the vane 201 is thus rotated, the oil filling the drum 200 is forced out the discharge port 207 and the flapper valve 206 is held closed against the lip 213 by the pressure of the coolant fluid. When the synchronizer brake is disengaged, the return spring 211 revolves the vanes 201 and 208 in a counterclockwise manner until the vane 201 rests against the lip 204 in the dashed position shown. Sump oil is drawn through the port 203 and through the flapper valve 206, which is opened because of the suction created by the vane 201 returning, to refill the drum 200 with cooling fluid for the next brake engagement. Thus, the vane 201 will displace a large amount of cooling fluid at a relatively low pressure while the vane 208 requires a relatively small amount of pressure fluid at a high pressure to actuate the pump. The pump may be designed so that the vane 201 will displace 200 cubic inches of fluid at 15 p.s.i. while the vane 208 requires only 20 cubic inches of fluid at 150 p.s.i. which is the normal line pressure to be run in transmission control circuits such as the one described above.

During operation in a forward direction, the manual shift valve 14, FIG. 1, is moved from the neutral position shown to the drive position thereby connecting fluid pressure passage 13 with fluid pressure passage 36. The pressure in passage 36 causes the low-ratio engaging device to engage to provide a drive path from the input shaft to the output shaft of the transmission. As the vehicle speed increases, the output governor 32 develops a pressure in passage 54 which acts on the right side of lands 42 and 72 to oppose the force of the springs 52 and 82 and the TV plugs 48 and 78. When the pressure in passage 54 has developed sufficiently to overcome the spring 52 and the TV plug 48, the 1—2 shift valve 34 will be upshifted to connect the line pressure passage 31 to the second ratio engage passage. When the second ratio engage passage is pressurized, the synchronizer relay valve 91 will be shifted due to the pressure exerted on land 98. When the synchronizer relay valve shifts, the pressure in passage 61 is directed through port 106 to passage 107 and the lower end of land 147 to cause the synchronizer control valve to move upward in its bore thereby disconnecting governor passage 159 from accumulator governor passage 158. The passage 107 is also connected through the synchronizer control valve 108 to passage 175 which is connected through the synchronizing control valve 162 to passage 178 to engage the synchronizer brake 177. As the synchronizer brake is engaged, the output speed of the turbine engine will decrease thus causing a decrease in the governor pressure in passage 159. As described above, when the pressure in passage 159 is decreased a sufficient amount so that the pressure in passage 159 times the area of valve land 164 equals the pressure in passage 158 times the area of valve land 167, the synchronizing valve will move to regulate the synchronizer brake to hold the turbine speed at the balancing r.p.m.

The pressure in passage 61 passes through the restriction 92 to the passage 61' where it enters the spring chamber of the synchronizer relay valve 91, the accumulator 94 and the second ratio engage device 93. The restriction 92 and the accumulator 94 control the rate of pressure rise in the passage 61'. When the pressure in passage 61' has developed sufficiently to engage the second ratio engaging device, it will also have developed in the spring chamber of the synchronizer relay valve to permit spring 101 to return the valve spool 96 to the position shown thereby connecting passage 107 to passage 111 which is connected to exhaust port 138 of the synchronizer relay valve 112. At this time, the synchronizer brake 177 is regulating the input speed to the transmission relative to the output speed of the transmission so that the second ratio engaging device will engage absorbing very little energy during its engagement. The transmission is thus conditioned for second ratio drive.

As the vehicle speed continues to increase, the pressure in passage 54 will continue to increase until the 2—3 shift valve 33 is shifted thereby connecting the passage 31 through the third ratio passage 88 which is connected through a restriction 122, accumulator 123, and a third engaged device 126. The passage 88 is also connected to the synchronizer relay valve 112 which will be shifted against the spring 136 to permit the pressure in passage 88 to enter passage 111. The pressure in passage 111 will then be directed through the synchronizer relay valve 91 to passage 107 and to the synchronizer control valve 108. The synchronizer control valve will then function identical to the manner described above for the second ratio shift to engage the synchronizer brake to reduce and maintain the input speed of the transmission. At balancing r.p.m., the restriction 122 and the accumulator 123 function to control the pressure rise in passages 127 which, when it has risen a sufficient amount, will permit the spring 136 to move the synchronizer relay valve 112 back to the position shown thereby exhausting the synchronizer control valve. At this time, the shift from second ratio to third ratio will have been completed. During third ratio drive, the second ratio engaging device remains engaged. However, the overrunning member associated therewith will permit the gear element to which it is attached to overrun. The low ratio engaging device also remains engaged during third ratio and during second ratio with the overrunning or one-way device associated therewith permitting freewheeling of the gearing element.

If the vehicle speed decreases, the pressure in passage 54 will decrease thereby permitting the second to third shift valve 33 to downshift so that passage 88 is exhausted to passage 58 and the third ratio engaging device 126 is rapidly exhausted through the ball check 129 to permit it to disengage. When the third ratio engaging device 126 is disengaged, the turbine speed will increase until it has increased a sufficient amount to permit the second ratio engaging device to control the gearing ratio. The second ratio engaging device will automatically establish a reaction member in the transmission gearing when the input speed rises a sufficient amount to cause the gearing to react in such a manner as to try to drive the one-way device associated with the second ratio engaging device 93 in its lock direction.

Further decrease of output speed will permit the first to second shift valve 34 to downshift thereby connecting the second ratio engaging device 93 to exhaust through the ball check valve 104 and again to permit the input speed to the transmission to increase. As the input shaft speed increases, the gearing will begin to undergo a change until the low ratio engaging device becomes active due to its one-way device to establish the drive ratio.

When the manual valve 14 is moved to reverse, the reverse ratio engaging device is engaged thereby conditioning the transmission for reverse drive while the passages 31 and 36 are connected to exhaust. There is no upshift or downshift associated with the reverse ratio engaging device once it has been established so the need for the synchronizing valve is not present.

Thus it is seen from the above description of operation that with a transmission using one-way reaction devices, the need for synchronization between input and output speed is only necessary during upshifting operations since the one-way devices automatically engage during downshifting.

Figure 2:
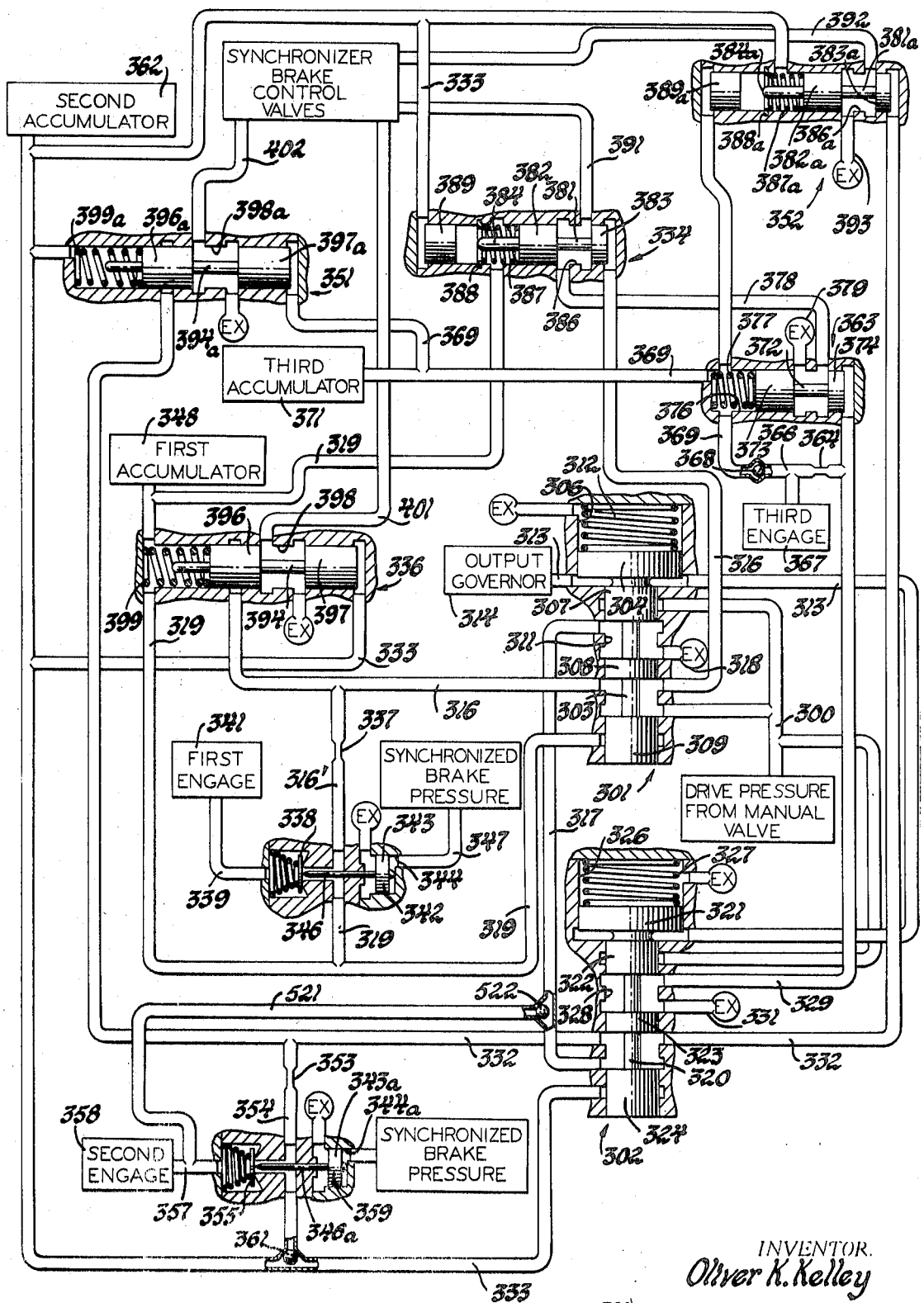
FIGS. 2 and 3 are a diagrammatic representation of another embodiment of the invention having upshift and downshift synchronizing.
Figure 3:
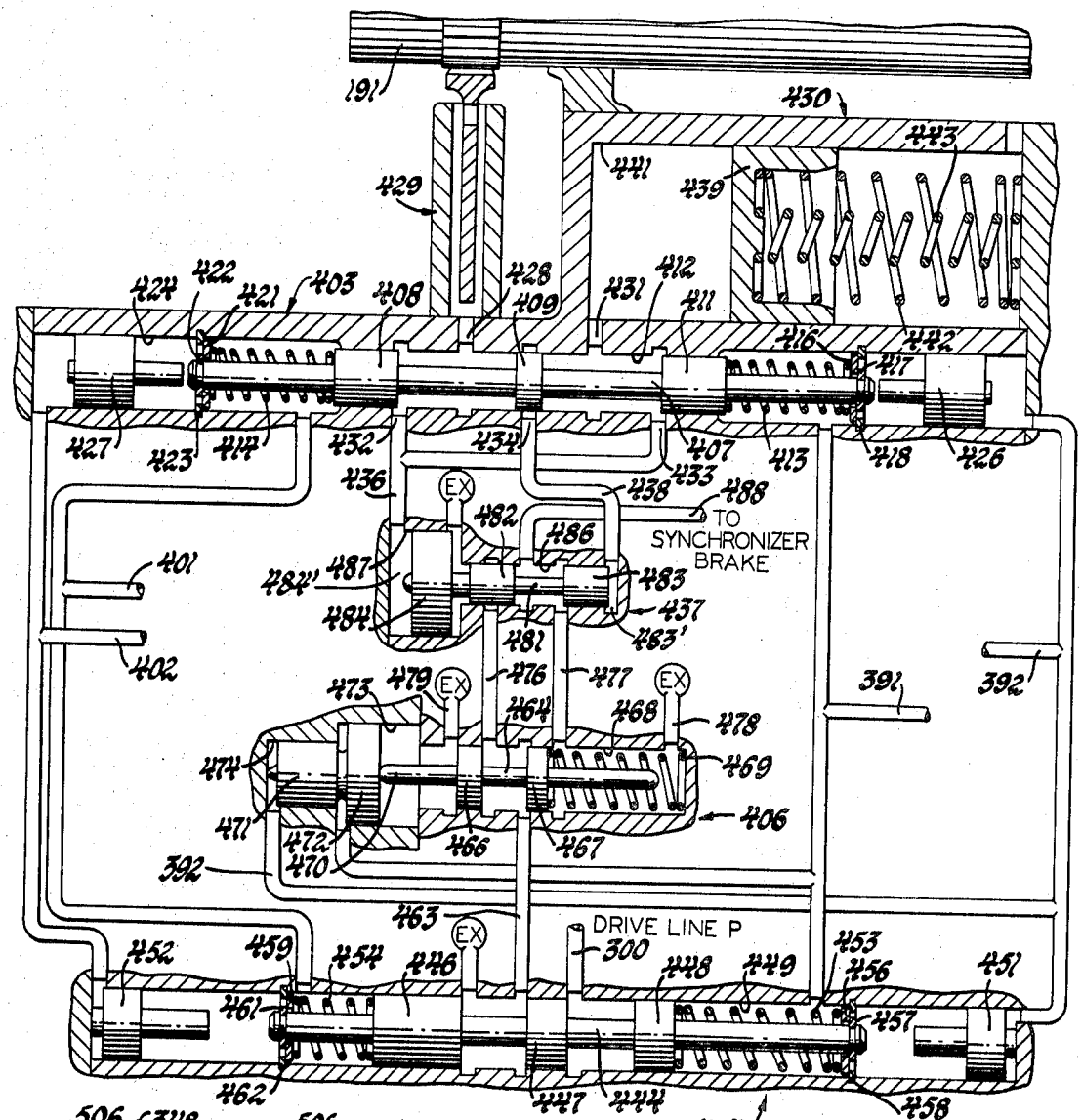

The control system shown in FIGS. 2 and 3 is provided for a step-ratio transmission wherein one-way devices are not used for the first and second ratios. Therefore, during an upshift from first to second, the first ratio engaging device must be disengaged while the second ratio engaging device is engaged and likewise, during an upshift from second to third, the second ratio device is disengaged while the third ratio device is engaged. Also, during downshifting from third to second, the third ratio device is disengaged while the second ratio device is engaged and the same is true on a downshift from second to first. Therefore, the input speed to the transmission must be controlled both during upshifting and downshifting. The control system shown in FIG. 2 has a main line pressure passage 300 which receives pressure fluid from a manual control valve such as that shown in FIG. 1 and delivers it to a first to second shift valve 301 and a second to third shift valve 302. The first to second shift valve 301 has a valve spool 303 which has a large diameter land 304 slidably disposed in a bore 306 and three smaller and equal diameter lands 307, 308, and 309 slidably disposed in a bore 311. A return spring 312 is held in compression between one end of bore 306 and the land 304 to maintain the 1—2 shift valve in the downshifted position, as shown. A governor passage 313 is connected to the land 304 on the side opposite the spring 312 and receives fluid pressure from an output-driven governor 314. The bore 311, besides being connected to the main line passage 300, is connected to the first ratio engage passage 316 and a first to second ratio control passage 317 and an exhaust passage 318. In the downshifted position shown, the passage 317 is connected between lands 307 and 308 to the exhaust passage 318 while the first ratio engage passage 316 is connected to main line passage 300 between lands 308 and 309. The valve land 307 blocks another portion of the main passage 300. When the 1—2 shift valve 301 is moved to the upshift position by a governor pressure acting on the land 304, the main passage 300 is connected between lands 307 and 308 with the first to second control passage 317 while the first ratio engage passage 316 is connected between lands 308 and 309 to the exhaust passage 318. Also, when the valve 301 is upshifted, a first ratio exhaust passage 319 is opened to exhaust at the end of bore 311 by the land 309.

The 2—3 shift valve 302 is similar in construction to the 1—2 shift valve having a valve spool 320 with a large diameter land 321 and three equal smaller diameter lands 322, 323 and 324. The land 321 is slidably disposed in a bore 326 in which is contained a return spring 327, held in compression between one end of bore 326 and the land 321. The lands 322, 323 and 324 are slidably disposed in a bore 328. The governor passage 313 is connected to the land 321, opposite the return spring 327. The bore 328 besides being connected with the main pressure passage 300, is also connected with a third ratio engage passage 329, the 1—2 control passage 317 and a second ratio exhaust passage 333. In the downshifted position shown, the main passage 300 is blocked by land 322 while the third ratio engage passage 329 is open to exhaust 331 between lands 322 and 323 and the second ratio engage passage 332 is open to the 1—2 control passage 317 between lands 323 and 324 and the second ratio exhaust passage is closed by land 324. When the shift valve 302 is moved to the upshifted position by governor pressure in passage 313, the main line passage 300 is open between lands 322 and 323 to third ratio engage passage 329 while the second ratio engage passage 332 is open to exhaust passage 331 between lands 323 and 324, the 1—2 control passage 317 is blocked by land 324 and the second ratio exhaust passage 33 is opened to exhaust through the bottom of bore 328 by the valve land 324.

The first ratio engage passage 316 is connected to an upshift synchronizer relay valve 334, a downshift synchronizer relay valve 336 and through a restriction 337 and a passage 316' to a check valve 338. The check valve 338 admits fluid pressure to a passage 339 to engage the first ratio engaging device 341. The check valve 338 may also be opened by a pilot valve 342 which is composed of a plug 343 slidably disposed in a bore 344 and having a stem 346 which abuts the check valve 338. The pilot valve 342 is operated by pressure in a synchronizer brake passage 347. The function of this pilot valve will be described later. The passage 316' is also connected to the first exhaust passage 319 which is connected to the downshift synchronizer relay valve 336, a first accumulator 348, and the upshift synchronizer relay valve 334. The restriction 337 and the first accumulator 348 function to provide a control pressure rise in the passage 319 to control the engagement of the first ratio engaging device 341. As will be described later, this control pressure rise also operates to shift the downshift synchronizer relay valve 336 and the upshift synchronizer relay valve 334.

The second ratio engage passage 332 is connected to a downshift synchronizer relay valve 351 and an upshift synchronizer relay valve 352 and through a restriction 353 and a passage 354 to a check valve 355. The check valve 355 is similar to the check valve 338 and is connected via passage 357 to a second ratio engaging device 358. The check valve 355 is also controlled by pilot valve 359 which is similar in construction to pilot valve 342 such that corresponding parts are given the same numerical designation with an "a" suffix. The passage 354 is connected to a ball check valve 361 to the second ratio exhaust passage 333 which is connected to the downshift synchronizer relay valve 336, the downshift synchronizer relay valve 351, a second accumulator 362, the upshift synchronizer relay valve 334 and the upshift synchronizer relay valve 352. The restriction 353 and the accumulator 362, function to control the rate of pressure rise in the passages 354 and 333 to affect proper engagement of the second ratio engaging device 358 and proper functioning of the downshift and upshift synchronizer relay valves as will be described later.

The third ratio engaged passage 329 is connected to an upshift synchronizer relay valve 363 and through a restriction 364 to a passage 366 which is connected to a third ratio engaging device 367. The passage 366 is connected through a ball check 368 to a passage 369 which is connected to the upshift synchronizer relay valves 363 and 352, to a third accumulator 371 and to the downshift synchronizer relay valve 351. The upshift synchronizer relay valve 363 includes a valve spool 372 having a pair of spaced lands 373 and 374 slidably disposed in a bore 376 with a spring 377 between land 373 and one end of bore 376 to urge the valve spool 372 to the position shown. In the position shown, a passage 378 connects the upshift relay valve 363 to the upshift relay valve 334 and an exhaust passage 379 is also connected to the bore 376.

The upshift synchronizer relay valve 334 includes a valve spool 381 having equal diameter lands 382 and 383 and a stem 384 extending from one end of land 382. The stem 382 and 383 are slidably disposed in a bore 386 which also houses a spring 387, held between a snapring 388, secured in bore 386, and one end of land 382. Also, slidably disposed in the bore 386 is a plug valve 389 which may be moved by pressure in second exhaust passage 333 to engage the stem 384 of the valve spool 381. In the spring-biased position shown, the passage 378 is connected between lands 382 and 383 to an upshift synchronizer brake control passage 391. However, when pressure is present in the first ratio engage passages 316 which is connected to the end of land 383, the valve spool 381 will be moved against the spring to open passage 316 to the upshift control passage 391. Also pressure will be admitted to the control passage 391 whenever the upshift synchronizer relay 363 is shifted in response to pressure fluid in third ratio engage passage 329 which acts on the end of land 374 to move the valve spool 372 against the spring 377 to admit fluid pressure to passage 378.

The upshift synchronizer valve 352 is identical to the synchronizer relay valve 334 and corresponding parts have been given the same numerical designation with an "a" suffix. An upshift control line 392 and an exhaust passage 393 are connected between lands 382a and 383a in the spring set position shown. However, when pressure is present in the second ratio engage line 332, the valve spool 381a will move against the bias spring 387a to admit pressure in passage 392.

The downshift synchronizer relay valve 336 includes a valve spool 394 having two spaced equal diameter lands 396 and 397 slidably disposed in a bore 398 and a spring 399 between the land 396 and one end of bore 398. An exhaust passage is connected between the lands 396 and 397 in the spring set position shown as in a downshift control passage 401. However, when pressure is available in passage 333, the valve spool 394 will move against the spring 399 to open the first ratio engage passage 316 between lands 396 and 397 to a downshift control passage 401.

The downshift synchronizer relay valve 351 is similar in construction to valve 336 and similar parts have been given the same numerical designation with an "a" suffix. An exhaust passage is also connected between the lands 396a and 397a in the spring set positions shown as is a downshift control passage 402. However, when pressure is present in the passage 369, the valve spool 394a will move against the spring 399a to communicate fluid pressure in the second ratio engage passage 332 to the downshift control passage 402.

The upshift and downshift control lines 391, 392, 401 and 402 are connected to the synchronizer brake control valves shown in FIG. 3. The upshift control passage 391 is connected to an input governor pressure control valve 403, a synchronizer pressure control valve 404 and an upshift pressure control valve 406.

The input governor pressure control valve 403 includes a valve spool 407 having three spaced lands 408, 409, and 411 slidably disposed in a bore 412. The spool 407 is centered in the bore 412 by a pair of return springs 413 and 414. The return spring 413 is held between the land 411 and a washer 416 which is positioned by a snapring 417 and the valve spool 407 when the valve is centered. However, if the valve spool 407 is moved to the right, the washer 416 engages a snapring 418 which is secured in a bore 419 to cause the spring 413 to be further compressed thereby causing an increased force on the right end of spool 407. The spring 414 is held between the land 408 and a washer 421 which is positioned by a snapring 422 and the valve spool 407 in the center position. However, if the valve spool 407 is moved to the left, the washer 421 engages the snapring 423, secured in a bore 424 to cause the spring 414 to be further compressed thereby producing an increased force on the left end of spool 407. An upshift plug 426 is slidably disposed in the bore 419 and a downshift plug 427 is slidably disposed in the bore 424. The plug 426 is moved to the left and engages the valve spool 407 which is moved to the left whenever pressure is present in upshift control passage 392. The valve land 411 and the right end of spool 407 are acted on by pressure when it is present in the upshift control passage 391 to move the valve spool 407 to the left against spring 414. The land 408 and the right end of spool 407 are acted on by pressure when it is present in the downshift control passage 401 to move the valve spool 407 to the right against spring 413. The valve plug 427 is acted on by fluid pressure in the downshift control passage 402 to cause the plug 427 to engage the spool 407 to move the spool to the right against the spring 413. The bore 412 has a governor inlet port 428, an accumulator port 431 in fluid communication with an accumulator 430, an upshift governor port 432, a downshift accumulator port 433, and an upshift accumulator port 434. The ports 433 and 432 are connected to an upshift governor passage 436 which is connected to a synchronizing valve 437. The port 434 is connected to an accumulator passage 438 which is also connected to the synchronizing valve 437. The governor 429 is an oil spin governor and is driven by the gas turbine output shaft 191. The oil spin governor provides the fluid pressure which is proportional to the speed of the shaft 191. The accumulator 430 includes a piston 439 slidably disposed in a bore 441 and urged to one end of the bore by a pair of compression springs 442 and 443. The governor port 432 and the accumulator port 433 are interconnected as mentioned above, and provide equal pressures between the governor and the accumulator whenever the input governor pressure control valve 403 is in the central position shown. However, when the control valve 403 is moved to the upshift position, to the left, the governor pressure in passage port 428 is connected to passage 436 while the accumulator pressure in port 431 is connected to passage 438. When the control valve 403 is moved to the downshift position, the governor pressure in port 428 is connected to the passage 438 and the accumulator pressure in port 431 is connected to passage 436.

A synchronizer pressure control valve 404 includes a valve spool 444 having spaced lands 446, 447, and 448 slidably disposed in a bore 449 and two plug valves 451 and 452 also slidably disposed in the valve bore 449. The valve spool 444 is centered by a pair of centering springs 453 and 454. The spring 453 is held in compression between valve land 448 and washer 456 which is positioned in the center position by snapring 457 on spool 444 and by a snapring 458 in bore 449 when the valve spool 444 is moved to the right. The centering spring 454 is held in compression between the land 446 and a washer 459 which is positioned in the center position by a snapring 461 on the spool 444 and in the leftward position by a snapring 462 secured in the bore 449. In the center position, a passage 463 connected between the upshift pressure control valve 406 and the synchronizer control valve 404 is opened to exhaust between lands 446 and 447. Also, in the center position, main pressure in passage 300 is admitted between lands 447 and 448. However, this pressure is closed to passage 463 by the land 447. When fluid pressure is present in either upshift passage 391 or 392, the valve spool 444 is moved to the left against spring 454 to open passage 463 between lands 447 and 448 to passage 300 while the exhaust passage is closed. Whenever pressure is present in the downshift control passages 401 or 402, the valve spool 444 is moved to the right against spring 453 to connect passage 463 with passage 300 between lands 446 and 447 while the exhaust passage is closed by land 446.

The upshift pressure control valve 406 includes the valve spool 464 having equal diameter lands 466 and 467 which are slidably disposed in a bore 468 and a spring 469 compressed between land 467 and one end of bore 468. The valve spool 464 has an extension 470 that engages a plug valve having a large diameter land 472 and a small diameter land 471 slidably disposed in bores 473 and 474 respectively. The large diameter land 472 is open on one side to pressure fluid in the upshift control passage 391 and the small diameter land 471 is open to upshift control pressure passage 392. Thus whenever pressure is available in either passage 391 or 392, the valve spool 464 will be moved against the spring 469. In the spring set position shown, the passage 463 is open between lands 466 and 467 to passage 476 which is connected to the synchronizing valve 437. In the spring set position shown, a passage 477 connected between the synchronizing valve 437 and the upshift pressure control valve 406 is open to an exhaust passage 478 which is connected to the spring chamber of the upshift pressure control valve 406. The upshift pressure control valve 406 also has another exhaust passage 479 between the large diameter 472 and land 466 in the spring set position. Whenever the valve spool 464 is moved against the spring 469 by pressure in passage 391 or 392, the passage 477 is open between lands 466 and 467 to passage 463 and the passage 476 is open between land 466 and land 472 to the exhaust passage 479.

The synchronizing valve 437 has a valve spool 481 having two equal diameter lands 482 and 483 and a larger diameter land 484 which are slidably disposed in bores 486 and bore 487 respectively. The passages 476 and 477 are connected with the bore 486 which is also connected to a synchronizer brake engage passage 488. This passage directs fluid pressure to a synchronizer brake which may be constructed in accordance with the brake shown in FIG. 5. This passage 488 also provides exhaust of the brake apply pressure. The synchronizing valve 437 is connected to governor pressure and to governor accumulator pressure at valve lands 483 and 484 depending on whether an upshift or a downshift is occurring. If an upshift is occurring, the valve spool 407 has been moved to the left so that governor pressure in port 428 is directed through passage 436 to an upshift governor chamber 484' where the pressure acts on valve land 484 while accumulator pressure in passage 431 is directed through passage 438 to an upshift accumulator chamber 483' where the pressure acts on land 483. Thus, it can be seen that when the shift occurs, governor and accumulator pressure being equal, and valve land 484 being larger, the valve spool 481 will move to the right to connect the synchronizer brake line 488 to passage 477. When an upshift is occurring, the upshift control valve 406 has been moved to the right against spring 469 and the synchronizer pressure control valve 404 has been moved to the left against spring 454 thus admitting drive pressure from passage 300 to passage 463 to valve 406 to passage 477 and on the synchronizer brake. The synchronizer brake thus engaged causes the turbine shaft 191 to decrease its speed thereby reducing the pressure in port 428 and thus the pressure acting on valve land 484. The pressure on valve land 484 will continue to decrease until the product of pressure times area of valve land 484 is equal to or slightly less than accumulator pressure times the area of valve land 483 so that the valve spool 481 can be moved to the left. This will connect the synchronizer brake passage 488 to passage 476 which is connected to exhaust 479 due to the fact that the upshift pressure control valve spool 464 has been moved to the right. As the synchronizer brake force begins to decrease, the turbine will reaccelerate and this results in regulation of turbine speed at the balance value. When the upshift engage element is fully pressurized, the valves 403, 404 and 406 will return to their center position and a new drive ratio is established. When a downshift occurs, the valve spool 407 moves to the left thus admitting governor pressure to the passage 438 and accumulator 436. The synchronizer pressure control valve 404 will be moved to the right thus again admitting pressure on passage 300 to passage 463 where it will pass through the pressure control valve to passage 476, but will be blocked by valve land 482. The valve spool 481 of the synchronizing valve 437 will be in its rightward position because the accumulator pressure acting on valve land 484 will be equal to the governor pressure acting on valve land 483 at the beginning of the downshift. Thus the synchronizer brake passage 488 is opened to exhaust through passage 477 and exhaust passage 478. The turbine shaft 191 is then free to accelerate until the governor pressure in passage 438 times the area of land 483 is greater than the fixed accumulator pressure in passage 436 times the area of land 484 at which time the valve spool 481 will move to the left admitting fluid pressure in passage 476 to passage 488 to engage the synchronizer brake. The synchronizer brake regulation will then hold the turbine shaft 191 at the desired speed while the downshift is being completed. When the downshift engage element has been fully pressurized, the valves 403, 406 and 404 will return to their spring bias or center positions.

Figure 4:
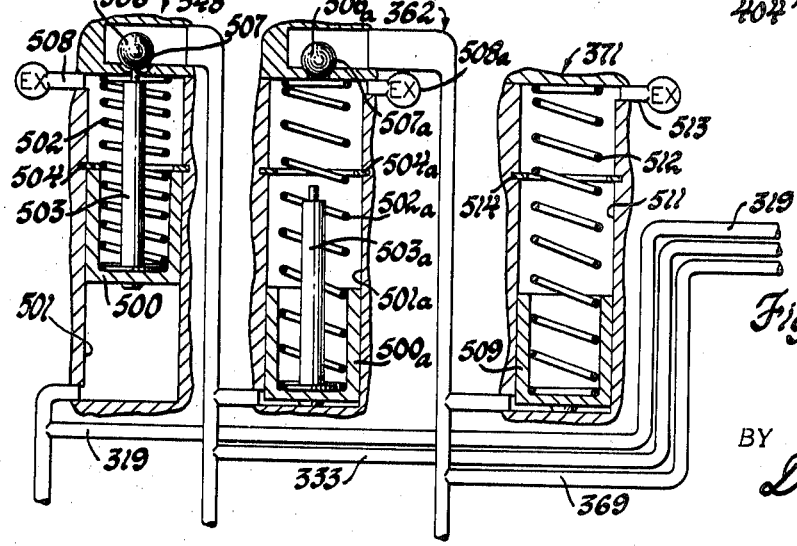
FIG. 4 is a diagrammatic representation of accumulators used with FIG. 2.

The first accumulator 348, second accumulator 362 and third accumulator 371 are shown in detail in FIG. 4. The first accumulator 348 includes a piston 500 slidably disposed in a bore 501 and a spring 502 compressed between the piston 500 and one end of the bore 501. A stem 503 is secured to the piston 500 and extends inside of the spring 502. The piston 500 is moved upward in the bore 501 against the spring 502 when fluid pressure is present in the first exhaust passage 319. Upward movement of the piston 500 is limited by a snapring 504 which is secured in a groove in the bore 501. A ball check 506 is mounted in a seat 507 at the end of the bore 501 adjacent the spring 502. When the piston 500 is moved upward in the bore 501, the stem 503 contacts the ball check 506 to move it up in the seat 507 to permit fluid pressure in the second exhaust passage 333 to be exhausted through the seat 507 to an exhaust passage 508. Thus whenever the first accumulator 348 is filled with pressure fluid, the second accumulator 362 is exhausted.

The second accumulator 362 is similar in construction to the first accumulator 348 and the corresponding parts have been given the same numerical designation with an "a" suffix. When fluid pressure is present in the second exhaust passage 333, the piston 500a is moved upward in the bore 501a against the snapring 504a and the stem 503a pushes the ball check 506a off of seat 507a to permit fluid pressure in passage 369 to be exhausted through exhaust port 508a.

The third accumulator 371 is similar to the first and second accumulators but does not include a stem member secured to the piston. The third accumulator has a piston 509 slidably mounted in a bore 511 and urged downward therein by a spring 512. An exhaust passage 513 prevents pressure buildup in the spring chamber above the piston 509. When fluid pressure is present in passage 369, which occurs during the engagement of the third ratio engaging device, the piston 509 moves upward against the spring 512 until it contacts a snapring 514 secured in a groove in the bore 511.

Shifting from neutral to forward drive, the main line passage 300 is pressurized. The first engage passage 316 is connected to passage 300 through the 1—2 shift valve 301. Pressure rises rapidly upstream of restriction 337 and the land 383 of the upshift synchronizing relay valve 334 is immediately pressurized causing the valve to move against the spring 387 to admit fluid pressure to the upshift control passage 391. As described above, this pressure in passage 391 causes the input governor pressure control valve to move to the upshift position admitting governor pressure to the land 484 of the synchronizing valve 437 and accumulator pressure to land 483 of the synchronizing valve 437, thus actuating the valve 437 to engage the synchronizer brake. This reduces turbine idling speed prior to pressurizing the first engage element. The pressure in first engage passage 316 passes through the restriction 337 to be admitted to the first ratio engaging device 341, the other end of valve 334, and the first accumulator 348. When pressure rise in passage 319 has reached full holding power of first engage element, the pressure at the other end of valve 334 assisted by spring 387 will return valve 334 to exhausting position thus releasing the synchronizer brake. The vehicle will then accelerate in a forward direction with the transmission conditioned for the first ratio so that the output governor 314 will produce a pressure signal proportional to vehicle speed. As the governor pressure in passage 313 increases to a predetermined value, the 1—2 shift valve 301 will be upshifted thereby admitting fluid pressure in main passage 300 to the 1—2 control passage 317 while exhausting the first ratio engage passage 316 and the passage 319. The passage 317 is connected through the 2—3 shift valve 302 to the second ratio engage passage 332 which immediately pressurizes the upshift synchronizer relay valve 352 to cause pressure to be admitted from passage 332 to upshift control passage 392 to actuate the synchronizer brake control valves as described above. With the synchronizer brake engaged, the speed of the turbine shaft 191 will be reduced to and maintained at a value which establishes a speed ratio between the turbine shaft 191 and the transmission output shaft which is equal to the step ratio of the transmission gearing. Also, during the upshift of first to second, the first accumulator 348 will be rapidly exhausted through the end of bore 311 of the 1—2 shift valve 301 to permit pressurization of the second accumulator 362. The second accumulator 362 and the second ratio engaging device 358 are pressurized at a controlled rate through restriction 353. This controlled rate of pressure rise is established in the second ratio exhaust passage 333 and acts on the land 382a of the upshift synchronizer relay valve 352. When the pressure in passage 333 has reached a predetermined level, the second ratio engaging device will be engaged to condition the transmission for drive in the second ratio and the upshift synchronizer relay valve 352 will be returned to the spring set position by pressure on land 382a thus disconnecting the synchronizer brake from pressure to permit it to disengage so that drive in second ratio forward will be maintained. Also, during a first to second upshift, the first ratio engaging device is maintained and engaged to prevent runaway of the turbine shaft 191 until the synchronizer brake has been pressurized. As the synchronizer brake is pressurized, the pilot valve 342 is moved to the left so that the stem 346 opens the check valve 338 to permit rapid disengagement of the first ratio engaging device.

As the output speed of the transmission continues to increase, the governor pressure in passage 313 continues to increase. At a predetermined level, the governor pressure in passage 313 will cause the 2—3 shift valve 302 to upshift thereby connecting main passage 300 to the third ratio engage passage 329 while exhausting the second ratio engage passage 332 and the second ratio exhaust passage 333. The pressure in third ratio-engage passage 329 causes the upshift synchronizer relay valve 363 to be immediately shifted to admit fluid pressure to passage 378 and then through the synchronizer relay valve 334 to the upshift control passage 391. The synchronizer brake is then again activated by the input governor pressure control valve and the synchronizer pressure control valve to cause the turbine shaft 191 to decrease in speed. The speed of the turbine shaft will be regulated at a value equal to the step ratio between the second and third gear ratios. The second ratio engaging device 358 is maintained engaged during the upshift until the synchronizer brake is pressurized thereby activating the pilot valve 359 which opens the check valve 355 to permit rapid disengagement of the second ratio engaging device to the second exhaust line 333. The third ratio engaging device is engaged at a controlled rate determined by the restriction 364 and the third accumulator 371. This control pressure rise is also effective on the upshift synchronizer relay valve 363 such that when the third ratio engaging device has been engaged, the synchronizing relay valve 363 will be returned to the spring set position shown and the synchronizer brake circuit will be exhausted.

With the transmission in third ratio, if the vehicle speed should decrease to a predetermined value, the pressure in governor passage 313 will decrease thus permitting the 2—3 shift valve 302 to downshift. When the valve 302 is downshifted to the position shown, the third ratio engaging device 367 is exhausted through passage 329 permitting the turbine shaft 191 to accelerate unloaded. The third accumulator 371, however, remains charged because of the check valve 368 preventing its exhaust through passage 329. With the third accumulator 371 charged, the plug valve 389a abuts the stem 384a of the upshift synchronizer relay valve 352 to prevent it from shifting when pressure is admitted to second ratio engage passage 332 through the 1—2 shift valve from passage 317. The passage 369 pressurizes the land 397a of the downshift synchronizer relay valve 351 to move it against the spring 399a to open passage 332 to the downshift control passage 402. Thus, when the second ratio engage passage 332 is pressurized through the 2—3 shift valve 302 during a downshift, the line 402 is pressurized thus activating the synchronizer brake controls and causing the input governor pressure control to shift to the right. With the input pressure governor control valve 403 shifted to the right as explained above, accumulator pressure is directed to the large land 484 while the governor pressure is directed to the small land 483. The synchronizing brake valve 437 will be moved to the right, as shown, permitting the passage 438 to be exhausted through passage 478. However, as the turbine shaft speed increases, the governor pressure will increase thus increasing the force on land 483 until the pressure times the area of land 483 is equal to the accumulator pressure times the area of land 484 causing the synchronizer valve 437 to move to the left to admit pressure to passage 488 thus engaging the synchronizer brake to establish a higher speed of the turbine shaft 191. The ratio between the speed of shaft 191 and the output shaft of the transmission will be equal to the step ratio between second and third gear ratios in the transmission. The pressure in passage 333 and in the second ratio engaging device 357 will increase at a predetermined rate to charge the accumulator 362 and to apply pressure to valve land 396a to counteract the pressure on valve land 397a to move the downshift synchronizer relay valve 351 to the spring set position shown thus connecting downshift control passage 402 to exhaust so that the synchronizer brake controls will return to their normal positions. As the second accumulator 362 is charged, the stem 503a will open the check valve 506a to exhaust the third accumulator 371.

As the speed of the output shaft continues to decrease, the 1—2 shift valve 301 will downshift at a predetermined value thus connecting the 1—2 control passage 317 to exhaust while connecting the first ratio engage passage to pressure. The second ratio engaging device 358 is exhausted through a passage 521 and a ball check valve 522. Whenever the 1—2 control passage 317 is pressurized, the ball check valve 522 is seated by the pressure in that passage to prevent the second ratio engaging device 358 from being pressurized through passage 521. The check valve 361 and the land 324 of the 2—3 shift valve 302 maintains the second ratio exhaust passage 333 blocked from exhaust and the second accumulator 362 remains charged. The second accumulator being charged urges the plug valve 389 of the upshift synchronizer relay valve 334 against the stem 384 to maintain the synchronizer relay valve 334 in the position shown and the second accumulator pressure also acts on the land 397 of the downshift synchronizer relay valve 336 to move it against the spring 399 to connect passage 316 to the downshift control passage 401. When the downshift control passage 401 is pressurized, the synchronizer brake control valving is again actuated to permit the turbine shaft speed to increase until the ratio between the turbine shaft speed and the transmission output shaft speed is the same as the step ratio between the first and second gear ratios of the transmission. The first ratio engaging device is engaged by the pressure in passage 316' which develops downstream of the restriction 337 and is controlled in its rise by the first accumulator 348 which is connected to first exhaust passage 319. When the pressure in first exhaust passage 319 increases a sufficient amount, the downshift synchronizer relay valve 336 will be moved to the spring set position shown by the pressure acting on land 396. When the downshift synchronizer relay valve 336 is moved to the position shown, the downshift control passage and the synchronizer brake control are exhausted. When the first accumulator 348 is fully charged, the second accumulator 352 is exhausted as described above.

Thus, it is seen during the upshift from one gear ratio to the next, the output speed of the gas turbine engine which is equal to the input speed of the transmission is reduced to establish a fixed ratio between the input and output speeds of the transmission. This ratio is determined by the diameters of lands 483 and 484. The ratio of the diameters is equal to the step ratio between the first and second gear ratio and between the second and third gear ratio.

Figure 9:
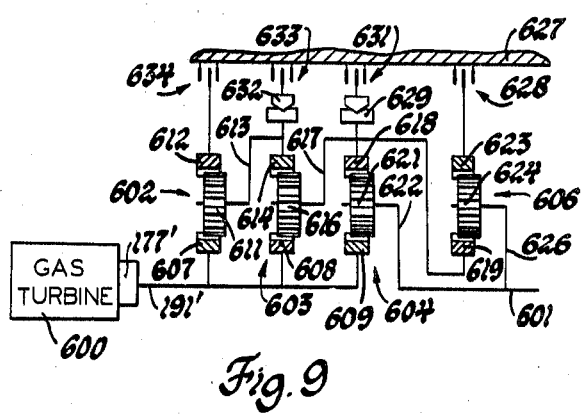
FIG. 9 is a schematic diagram of gearing that may be used with this invention.

The gearing arrangement shown in FIG. 9, which can be used with the above-described controls, includes an input shaft 191', driven by a gas turbine engine 600, an output shaft 601 and four planetary gear sets 602, 603, 604 and 606. A synchronizing brake 177' is connected to the shaft 191'. Each of the gear sets 602, 603 and 604 has a sun gear 607, 608 and 609 respectively, drivingly connected with the input shaft 191'. The planetary sets 602 has planet pinions 611 meshing with the sun gear 607 and a ring gear 612 meshing with the planet pinions 611. The planet pinions 611 are rotatably mounted on a carrier 613 which is drivingly connected to a ring gear 614 from the planetary set 603. The planetary set 603 also has planet pinions 616 meshing with the sun gear 608 and the ring gear 614 and rotatably mounted on a carrier 617 which is drivingly connected to the ring gear 618 to the planetary set 604 and the sun gear 619 of the planetary set 606. The planetary set 604 has planet pinions 621 meshing with the sun gear 609 and the ring gear 618 and rotatably mounted on a carrier 622 which is drivingly connected to the output shaft 601. The planetary gear set 606 has a ring gear 623 and pinion gears 624 meshing with the sun gear 619 and the ring gear 623 and rotatably mounted on a carrier 626 which is also drivingly connected to the output shaft 601. The ring gear 623 may be selectively connected to the transmission housing 627 through a friction brake or ratio engaging device 628. The ring gear 618 can be selectively connected to the transmission housing 627 through a one-way device 629 and a friction ratio engaging device 631 which are connected in series. The ring gear 614 can be connected to the transmission housing 627 through a one-way connected 632 and a friction ratio engaging device 633. The ring gear 612 can be selectively connected with the transmission housing 627 through a friction ratio engaging device 634. The friction ratio engaging devices are of conventional disc-type design, adapted to be engaged by fluid under pressure.

To establish low ratio in the transmission gearing, the friction device 631 is engaged so that the friction device 631 and the one-way device 629 cooperate to prevent reverse rotation of the ring gear 618 such that when the sun gear 609 is driven forwardly, the carrier 622 and output shaft 601 will be driven forwardly. To establish second gear forward, the friction device 633 is engaged and cooperates with the one-way device 632 to prevent reverse rotation of the ring gear 614 such that the carrier 616 is driven forward, driving the ring gear 618 so that the speed of sun gear 609 and ring gear 618 are combined to drive the output shaft 601 in a forward direction more rapidly than first gear ratio. During second gear ratio, the friction device 631 is maintained engaged and the one-way device 629 permits forward rotation of the ring gear 618. During third gear forward, the friction device 634 is engaged thus connecting the ring gear 612 to the transmission housing 627 such that the carrier 613 is driven forwardly thereby driving the ring gear 614 forwardly which overruns the one-way device 632 to drive the carrier 617 forwardly more rapidly than it was driven in second ratio. The speed of carrier 617 and sun gear 609 combine in the planetary set 604 to drive the output shaft forwardly at a speed greater than the second ratio. Thus it is seen that during first gear, the one-way device 626 holds, during second gear the one-way device 632 holds while the one-way device 629 overruns, and during third gear, the friction device 634 holds while both one-way devices 629 and 632 overrun. Thus to provide a downshift to second gear, the friction device 634 is disengaged permitting a ring gear 612 to rotate in reverse and the sun gear 608 will attempt to drive the ring gear 614 in reverse which rotation is prevented by the one-way device 632. On a downshift from second to first gear, the friction device 633 is disengaged and the one-way device 629 prevents forward rotation of the ring gear 618. If the one-way devices 632 and 629 are eliminated, the friction device 631 will have to be disengaged on an upshift from second to third and the friction device 633 will have to be disengaged on an upshift from second to third gear. Thus the one-way devices are used in a transmission when a control such as that described above for FIG. 1 is used and the one-way devices are eliminated when a control circuit described above for FIGS. 2 and 3 are used. To establish reverse drive in the transmission, the friction device 628 is engaged thus preventing rotation of the ring gear 623 so that forward rotation of sun gear 609 provides reverse rotation of ring gear 618 and thus reverse rotation of sun gear 619 which causes reverse rotation of the carrier 626 in the output shaft 601.

The forward gear ratios provided by the planetary sets 604, 603 and 602 are designed such that the geometric step ratio between them is equal. That is, if the low ratio provided by planetary set 604 is 4.91, the ratio provided by the combination of planetary sets 603 and 604 will be 2.89 and the planetary ratio provided by all three sets will be 1.70. Thus, it can be seen that the geometric step between first and second is 1.70 and the geometric step between second and third is 1.70. If this step ratio is used with the synchronizing valve 162 or 437 and the input governors 17 or 429 provide a speed signal proportional to the square of the input shaft speed, the ratio of the diameter 164 to 167 will be equal to 1.70 and the ratio of diameter 484 to diameter 483 will be equal to 1.70. If the synchronizing valves are used with an input governor that produces a speed signal which is linear with shaft speed, then the area ratio of land 164 to 167 will be equal to 1.70 and the area of land 484 to land 483 will be 1.70.

During an upshift from first to second, the gas turbine shaft speed for the input shaft 191' is reduced due to the engagement of the synchronizing brake such that the speed ratio between the input shaft 191' and the output shaft 601 is equal remain 1.70. Since the output shaft 601 will remain constant during the shift and the input shaft speed 191' is decreased, the ring gear 618 will be driven forwardly to compensate for the speed difference between the sun gear 609 and the carrier 622. The forward speed of the ring gear and thus the carrier 617 will be such that the speed of ring gear 614 will be zero since the input speed 608 attempts to drive the ring gear in reverse and the forward speed of carrier 617 attempts to drive the ring gear forward. Thus the friction device 633 will be engaged with little or no slippage between the friction plates. The same is true on an upshift from second to third, that is, the ring gear 614 and carrier 613 will be driven forwardly by the speed of carrier 617 such that the ring gear 612 will be stationary.

On a downshift from third to second, the friction device 634 is disengaged and the input shaft 197 is allowed to speed up to establish the speed ratio 1.70 between the input and output shaft thus permitting the ring gear 612 to be accelerated in reverse which will cause a reduction in the forward speed of carrier 613. The carrier speed will continue to be reduced until the sun gear 608 attempts to drive the ring gear 614 in reverse at which time the one-way brake 632 will lock to place the transmission in second gear forward. If the one-way device 632 is not present, the friction device 633 will be engaged by the control system shown above in FIGS. 2 and 3 when the speed of ring gear 614 is substantially zero. On a downshift from second to first, the change in gearing operation, similar to that described above for third to second, will be undertaken to provide a smooth downshift to first gear without excessive heat generation in the friction device 631.

Since obvious modification and variations will occur to those skilled in the art, the foregoing description and drawing is intended as an illustration of the preferred embodiment of the invention and not as a limitation thereof.

I claim:

1. In a transmission control for use with a step-ratio transmission having an input shaft and a synchronizer brake means selectively engageable for controlling the speed of said input shaft; a source of fluid pressure; a shift valve means in fluid communication with said source and movable to a downshift and an upshift position; synchronizer brake control means including input driven governor means for providing a pressure proportional to the speed of said input shaft, governor accumulator means, a synchronizing valve having a governor chamber and an accumulator chamber and being movable to an engage position and an exhaust position, a synchronizer control valve having a normally open position connecting both said governor means and said governor accumulator means with both of said chambers and being movable in response to said shift valve means to a synchronizing position connecting said governor means to said governor chamber and said governor accumulator means to said accumulator chamber to move said synchronizing valve to said engage position to engage said synchronizer brake means to decrease the speed of said input shaft.

2. In a transmission control for use with a step-ratio transmission having an input shaft and a synchronizer brake means selectively engageable for controlling the speed of said input shaft; a source of fluid pressure; shift valve means in fluid communication with said source and movable to a downshift and an upshift position; a synchronizer relay valve means having a normally closed position and being movable to an open position in response to movement of said shift valve means to said upshift position; synchronizer brake control means operatively connected to said synchronizer relay valve means including input driven governor means for providing a pressure proportional to the speed of said input shaft, governor accumulator means, a synchronizer regulating valve having a governor chamber and an accumulator chamber and being movable to an engage position and an exhaust position, and a synchronizer control valve having a normally open position connecting both said governor means and said governor accumulator means with both of said chambers and being movable in response to opening of said synchronizer relay valve means to a synchronizing position connecting said governor means to said governor chamber and said governor accumulator means to said accumulator chamber to move said synchronizer regulating valve to said engage position to engage said synchronizer brake means to decrease the speed of said input shaft.

3. A transmission control for use with a change-ratio transmission, having an input shaft, an output shaft means for establishing a pair of drive ratios between said shafts with a step ratio between the drive ratios, including synchronizer brake means being operable at times for controlling the speed of said input shaft; a source of fluid pressure; shift valve means operatively connected to said transmission and being movable to a downshift position for establishing one drive ratio and to an upshift position for establishing the other drive ratio; upshift relay valve means operatively connected with and responsive to said shift valve means; synchronizer brake control valve means including synchronizing valve means movable for engaging and disengaging said synchronizer brake means having a governor chamber and an accumulator chamber, input governor means for providing a governor pressure signal proportional to the speed of the input shaft, accumulator means for establishing a fixed pressure signal relative to the governor pressure signal, synchronizer control valve means operatively connected to said upshift relay valve means and being movable to an open position to interconnect both of said chambers, said governor means and said accumulator means and to an upshift synchronizing position to connect said governor chamber with the governor pressure signal and the accumulator chamber with the fixed pressure signal to move said synchronizing valve means to engage said synchronizer brake.

4. In a transmission and control an input shaft; and output shaft; step-ratio gearing means operatively connected between said input and output shafts; selectively operable ratio engaging means operatively connected with said step-ratio gearing means for establishing a plurality of gear ratios in said step-ratio gearing means with a substantially equal geometric step ratio between the gear ratios; selectively operable synchronizer brake means operatively connected with said input shaft for controlling the speed of the input shaft to establish a speed ratio between said input and output shafts substantially equal to the step ratio; and control means for controlling the operation of said ratio engaging means and said synchronizer brake means including input governor means operatively connected to said input shaft for generating a governor signal proportional to the speed of the input shaft, accumulator means, a pair of shift valve means shiftable for controlling the operation of said ratio engaging means, synchronizer brake control means for controlling the operation of said synchronizer brake means including a synchronizing valve having a governor chamber and an accumulator chamber with a diameter ratio between said chambers equal to said step ratio, a pressure control valve movable to an open position to connect said input governor means with said accumulator means and both of said chambers and to an upshift position to connect said input governor means to said governor chamber only and said accumulator means to said accumulator chamber, and relay valves associated with and operatively connected between said shift valves and said pressure control valve, whereby said synchronizer brake is engaged when either of said shift valves is shifted to change gear ratios and to operate said relay valves and said pressure control valve to activate said synchronizing valve to establish the speed ratio between said input and output shafts substantially equal to said step ratio while the gear changed is occurring.

5. In a transmission control for use with an equal step-ratio transmission having an input shaft and a synchronizer brake means selectively engageable for controlling the speed of said input shaft; and output shaft and planetary gear means between said shafts, a source of fluid pressure; a shift valve in fluid communication with said source and movable to a downshift and an upshift position; a synchronizer relay valve having a normally closed position and being movable to an open position in response to movement of said shift valve to said upshift position; synchronizer brake control means including input-driven governor means for providing a pressure proportional to the speed of said input shaft, governor accumulator means, a synchronizer valve having a governor chamber and an accumulator chamber with the ratio of said chambers being proportional to said step ratio and being movable to an engage position and an exhaust position, a synchronizer control valve having a normally open position connecting both said governor means and said governor accumulator means with both of said chambers and having a synchronizing position connecting said governor means to said governor chamber and said governor accumulator means to said accumulator chamber to move said synchronizing valve to said engage position to engage said synchronizer brake means to decrease the speed of said input shaft to establish a speed ratio between said input and output shafts equal to said step ratio.

6. A transmission control for use with a change ratio transmission, having an input shaft, an output shaft means for establishing a pair of drive ratios between said shafts with a step ratio between the drive ratios, including synchronizer brake means being operable at times for controlling the speed of said input shaft; a source of fluid pressure; shift valve means operatively connected to said transmission and being movable to a downshift position for establishing one drive ratio and to an upshift position for establishing the other drive ratio; upshift relay valve means operatively connected with and responsive to said shift valve means; downshift relay valve means operatively connected with and responsive to said shift valve means; synchronizer brake control valve means including synchronizing valve means movable for engaging and disengaging said synchronizer brake means having a governor chamber and an accumulator chamber with said chambers having an area ratio proportional to said step ratio, input governor means for providing a governor pressure signal proportional to the speed of the input shaft, accumulator means for establishing a fixed pressure signal relative to the governor pressure signal, synchronizer control valve means operatively connected to said upshift relay valve means and said downshift valve means and being movable to an open position to interconnect both of said chambers with said governor means and said accumulator means, to an upshift synchronizing position to connect said governor chamber with the governor pressure signal and the accumulator chamber with the fixed pressure signal to move said synchronizing valve means to engage said synchronizer brake until the speed ratio of said input and output shafts equals said step ratio, and to a downshift synchronizing position to connect said accumulator chamber with the governor pressure signal and the governor chamber with the fixed pressure signal to move said synchronizing valve means to engage said synchronizer brake when the speed ratio of said shafts equals said step ratio.

7. In a transmission and control an input shaft; an output shaft; step-ratio gearing means operatively connected between said input and output shafts; selectively operable ratio engaging means operatively connected with said step-ratio gearing means for establishing three gear ratios in said step-ratio gearing means with an equal geometric step ratio between the gear ratios; selectively operable synchronizer brake means operatively connected with said input shaft for controlling the speed of the input shaft to establish a speed ratio between said input and output shafts substantially equal to the step ratio; and control means for controlling the operation of said ratio engaging means and said synchronizer brake means including input governor means operatively connected to said input shaft for generating a governor signal proportional to the speed of the input shaft, accumulator means, first shift valve means for controlling ratio change between the first and second of the gear ratios, second shift valve means for controlling ratio change between the second and third of the gear ratios, synchronizer brake control means for controlling the operation of said synchronizer brake means during a ratio change including a synchronizing valve having a governor chamber and an accumulator chamber with a diameter ratio between said chambers equal to said step ratio, a pressure control valve movable to an open position to connect said input governor means with said accumulator means and both of said chambers, to an upshift position to connect said input governors means to said governor chamber only and said accumulator means to said accumulator chamber, and to a downshift position to connect said governor means to said accumulator chamber and said accumulator means to said governor chamber, and relay valves associated with and operatively connected between said shift valves and said pressure control valve, whereby said synchronizer brake is engaged when either of said shift valves is shifted to operate said relay valves and said pressure control valve to activate said synchronizing valve to establish the speed ratio between said input and output shafts substantially equal to said step ratio.

8. In a transmission and control an input shaft; an output shaft; step-ratio gearing means operatively connected between said input and output shafts; selectively operable ratio engaging means operatively connected with said step-ratio gearing means for establishing three gear ratios in said step-ratio gearing means with an equal step ratio between the gear ratios; selectively operable synchronizer brake means operatively connected with said input shaft for controlling the speed of the input shaft to establish a speed ratio between said input and output shafts substantially equal to the step ratio; and control means for controlling the operation of said ratio engaging means and said synchronizer brake means including input governor means operatively connected to said input shaft for generating a governor signal proportional to the speed of the input shaft, accumulator means, a pair of shift valve means shiftable for controlling the operation of said ratio engaging means, synchronizer brake control means for controlling the operation of said synchronizer brake means including a synchronizing valve operatively connected with said synchronizer brake means and having a governor chamber and an accumulator chamber with a diameter ratio between said chambers equal to said step ratio, a pressure control valve movable to an open position to connect input governor means with said accumulator means and both of said chambers and to an upshift position to connect said input governor means to said governor chamber only and said accumulator means to said accumulator chamber, and relay valves associated with an operatively connected between said shift valves and said pressure control valve, whereby said synchronizer brake is engaged when either of said shift valves is shifted to operate said relay valves and said pressure control valve to activate said synchronizing valve to establish the speed ratio between said input and output shaft substantially equal to said step ratio and said ratio engaging means operative to establish the first and second gear ratios each having check valve means operatively connected with said synchronizer brake means for maintaining said first ratio engaged during a shift from first to second ratio until said synchronizer brake is engaged and for maintaining said second ratio engaged during a shift from second to third ratio until said synchronizer brake is engaged.

9. In a transmission, input means, output means, multiratio gear means operatively connecting said input and said output means and having first drive means operative to provide a low speed ratio between said input and said output means and second drive means having engaging means for disestablishing and establishing a second higher speed ratio between said input and said output means, synchronizer brake means having brake means operatively connected to said input means and actuator means for engaging and disengaging said brake means, input governor means providing a governor signal proportional to transmission input speed, shift control means movable from a first low-speed position to a second high-speed position and operative in said second position to provide a shift command signal operatively connected to said engaging means and said actuator means to move said actuator means from the disengaged to the engaged position, and reference signal means operatively connected to said actuator means and said input governor means and operative in response to said shift command signal to provide a continuous reference signal having a substantially constant value based on the value of said input governor signal when said shift command signal is received, said actuator means being responsive to said reference signal and said input governor signal to engage the synchronizer brake sufficient to control the speed of said input means to establish the speed ratio between said input and output means substantially equal to the step ratio between said low speed ratio and said second higher speed ratio for synchronizing the shift change.

PO-1050
(5/69)

UNITED STATES PATENT OFFICE
CERTIFICATE OF CORRECTION

Patent No. __3,572,479__   Dated __March 30, 1971__

Inventor(s) __Oliver K. Kelley__

It is certified that error appears in the above-identified patent and that said Letters Patent are hereby corrected as shown below:

Column 9, line 6, delete "33" and insert therefor -- 333 -

Column 16, line 23, delete "connected" and insert therefor -- device --;

Column 16, line 53, delete "626" and insert therefor -- 629 --;

Column 17, lines 21 and 22, after 'equal' insert -- to -- and delete "remain";

Column 19, line 14, "changed" should read -- change --.

Signed and sealed this 26th day of October 1971.

(SEAL)
Attest:

EDWARD M. FLETCHER, JR.
Attesting Officer

ROBERT GOTTSCHALK
Acting Commissioner of Patents